US012037816B2

(12) United States Patent
Lai

(10) Patent No.: US 12,037,816 B2
(45) Date of Patent: Jul. 16, 2024

(54) DUAL LOCKING COMBINATION PADLOCK WITH DECODE FUNCTION

(71) Applicant: The Sun Lock Company Limited, Tuen Mun (HK)

(72) Inventor: Karl Lai, Tai Po (HK)

(73) Assignee: THE SUN LOCK COMPANY LIMITED, Hong Kong (HK)

( * ) Notice: Subject to any disclaimer, the term of this patent is extended or adjusted under 35 U.S.C. 154(b) by 350 days.

(21) Appl. No.: 17/401,724

(22) Filed: Aug. 13, 2021

(65) Prior Publication Data

US 2022/0065001 A1 Mar. 3, 2022

Related U.S. Application Data

(60) Provisional application No. 63/071,544, filed on Aug. 28, 2020.

(51) Int. Cl.

*E05B 67/24* (2006.01)
*E05B 27/00* (2006.01)

(Continued)

(52) U.S. Cl.

CPC .............. *E05B 67/24* (2013.01); *E05B 27/00* (2013.01); *E05B 37/025* (2013.01); *E05B 37/0058* (2013.01); *E05B 37/0068* (2013.01)

(58) Field of Classification Search

CPC ........ E05B 67/24; E05B 27/00; E05B 37/025; E05B 37/0034; E05B 37/0058;

(Continued)

(56) References Cited

U.S. PATENT DOCUMENTS 4,751,830 A * 6/1988 Cheng ..................... E05B 37/16 70/285
5,175,709 A 12/1992 Slayton (Continued)

FOREIGN PATENT DOCUMENTS

CN 201068678 Y 6/2008
CN 206468121 U 9/2017

(Continued)

OTHER PUBLICATIONS

Combined Search and Examination Report dated Feb. 16, 2022 issued by the British Patent Office in Application No. GB2109105.3, 7 pages.

(Continued)

*Primary Examiner* — Christine M Mills
*Assistant Examiner* — Faria F Ahmad
(74) *Attorney, Agent, or Firm* — Ware, Fressola, Maguire & Barber LLP

(57) ABSTRACT

A padlock comprising a lock body, a combination mechanism to control the movement of the cam-spindle vertically, a key mechanism to control the movement of the cam-spindle rotationally, more than one clutch that is mounted in the cam-spindle which controls the vertically movement of the cam-spindle, wherein the cam-spindle is configured to control the locking and unlocking of the combination mechanism, and wherein more than one dial is mounted in the lock body, a locking bolt contacts the shackle, and the shackle has a long leg and a short leg with a bolt-receiving-cutout.

10 Claims, 9 Drawing Sheets

(51) Int. Cl.
*E05B 37/00* (2006.01)
*E05B 37/02* (2006.01)

(58) Field of Classification Search
CPC .... E05B 35/105; E05B 37/0068; E05B 67/22; E05B 67/003; E05B 67/10; E05B 37/0031; E05B 37/14; E05B 67/06; E05B 67/08; E05B 67/32; E05B 17/145; E05B 67/063
See application file for complete search history.

(56) References Cited

U.S. PATENT DOCUMENTS

| | | | | |
|---|---|---|---|---|
| 5,953,940 | A * | 9/1999 | Ling | E05B 37/025 70/20 |
| 6,029,481 | A | 2/2000 | Lai | |
| 6,035,672 | A | 3/2000 | Lai | |
| 6,164,096 | A | 12/2000 | Lai | |
| D439,824 | S | 4/2001 | Lai | |
| D439,825 | S | 4/2001 | Lai | |
| 6,408,660 | B1 | 6/2002 | Lai | |
| 6,474,116 | B1 | 11/2002 | Lai | |
| D472,790 | S | 4/2003 | Lai | |
| 6,675,614 | B2 | 1/2004 | Lai | |
| 6,729,166 | B1 | 5/2004 | Lai | |
| 6,742,366 | B1 | 6/2004 | Lai | |
| D498,132 | S | 11/2004 | Lai | |
| 6,883,355 | B2 | 4/2005 | Lai | |
| D511,673 | S | 11/2005 | Lai | |
| 7,114,356 | B1 | 10/2006 | Yu | |
| 7,117,698 | B2 | 10/2006 | Lai | |
| 7,140,209 | B2 | 11/2006 | Lai | |
| 7,225,648 | B2 | 6/2007 | Lai | |
| 7,467,531 | B2 | 12/2008 | Lai et al. | |
| 7,562,545 | B2 | 7/2009 | Lai et al. | |
| 7,628,045 | B2 | 12/2009 | Yu | |
| 7,685,851 | B2 | 3/2010 | Lai | |
| 7,698,913 | B2 | 4/2010 | Lee | |
| 7,765,840 | B2 | 8/2010 | Lai et al. | |
| 8,056,376 | B2 | 11/2011 | Yu | |
| 8,096,150 | B2 | 1/2012 | Lai et al. | |
| 8,261,583 | B2 | 9/2012 | Lai et al. | |
| 8,511,118 | B2 | 8/2013 | Lai et al. | |
| 8,661,861 | B2 | 3/2014 | Lai | |
| 8,776,556 | B2 | 7/2014 | Lai | |
| 8,826,703 | B2 | 9/2014 | Lai | |
| 8,919,155 | B2 | 12/2014 | Lai | |
| 8,931,313 | B2 | 1/2015 | Lai | |
| 9,206,625 | B2 | 12/2015 | Lai | |
| 9,228,373 | B2 | 1/2016 | Huang | |
| 9,228,376 | B2 | 1/2016 | Lai | |
| 9,441,399 | B2 | 9/2016 | Yu | |
| 9,464,460 | B2 | 10/2016 | Lai | |
| 9,487,969 | B2 | 11/2016 | Lai | |
| 9,556,650 | B1 | 1/2017 | Lai | |
| 9,663,970 | B1 | 5/2017 | Yang | |
| D789,174 | S | 6/2017 | Lai | |
| 9,803,398 | B2 | 10/2017 | Lai | |
| 9,890,559 | B2 | 2/2018 | Lai | |
| 10,047,541 | B2 | 8/2018 | Lai | |
| 10,214,942 | B2 | 2/2019 | Lai | |
| 10,221,591 | B2 | 3/2019 | Lai | |
| D864,695 | S | 10/2019 | Lai | |
| 10,443,272 | B2 | 10/2019 | Lai | |
| 10,890,013 | B2 | 1/2021 | Lai | |
| 11,199,025 | B2 * | 12/2021 | Lai | E05B 35/105 |
| 11,261,622 | B2 * | 3/2022 | Lai | E05B 37/0068 |
| 2006/0027001 | A1 * | 2/2006 | Lai | E05B 37/025 70/25 |
| 2007/0220929 | A1 * | 9/2007 | Green | E05B 37/025 70/25 |
| 2008/0120999 | A1 * | 5/2008 | Lee | E05B 37/0034 70/21 |
| 2009/0031764 | A1 | 2/2009 | Huang | |
| 2009/0113947 | A1 * | 5/2009 | Lai | E05B 37/025 70/21 |
| 2010/0095718 | A1 * | 4/2010 | Lai | E05B 37/025 70/284 |
| 2014/0338407 | A1 | 11/2014 | Zhang | |
| 2014/0352370 | A1 * | 12/2014 | Huang | E05B 37/025 70/21 |
| 2018/0371802 | A1 * | 12/2018 | Rodaer | E05B 67/24 |
| 2020/0190855 | A1 * | 6/2020 | Lai | E05B 37/002 |
| 2020/0318390 | A1 * | 10/2020 | Bartel | E05B 37/0055 |
| 2020/0408001 | A1 | 12/2020 | Lai | |
| 2021/0062542 | A1 * | 3/2021 | Lai | E05B 37/0068 |
| 2021/0189766 | A1 | 6/2021 | Lai | |

FOREIGN PATENT DOCUMENTS

| | | | |
|---|---|---|---|
| EP | 1529907 | B1 | 12/2012 |
| GB | 2577281 | B | 9/2020 |

OTHER PUBLICATIONS

Preliminary Search Report and Written Opinion dated Feb. 3, 2022 issued by the INPI in Application No. FR2107915, 18 pages.
PCT International Search Report and Written Opinion issued Mar. 19, 2020 from Application No. PCT/CN2019/125914, 7 pages.

* cited by examiner

DUAL LOCKING COMBINATION PADLOCK WITH DECODE FUNCTION

TECHNICAL FIELD

The present invention is directed to padlocks with dual locking mechanism.

BACKGROUND OF THE INVENTION

The combination padlock developed by Mr. Eric Lai U.S. Pat. No. 7,117,698 is High Security Padlock Construction which is one of the most secure combination padlock in the mid-size range.

SUMMARY OF THE INVENTION

The present invention contains dual locking controls where one is controlled by a key mechanism and the other is controlled by a combination mechanism. Also, the padlock contains a decode function wherein when the lock is unlocked by the key then the user can retrieve the lost code (lost combination code).

PARTS LIST (FIGS. 1A-19C)

10 Padlock
20 Protection Cover
30 Protection Cover other half.
40 Body Front Side. 41 Short-leg Shackle Hole. 42 Long-leg Shackle Hole.
43 Bolt Slot. 44 Spindle Hole. 45 Cylinder Hole. 46 Long-leg-protrusion-slot.
47 Decode Slot. 48 Reset-fin-Slot. 49 Torque-spring-slot. 50 Body Rear Side.
51 Short-leg Shackle Hole. 52 Long-Leg Shackle Hole. 53 Bolt Slot. 54 Spindle Hole.
55 Cylinder Hole 56 Long-Leg-protrusion-slot. 57 Decode Slot.
58 Decode-Bar-Channel 59 Rotational-Vertical-Channel. 50A Reset-Fin-Slot.
50B Torque-Spring-slot. 60 Shackle. 61 Short-Leg Shackle. 62 Long-Leg.
63 Bolt-receiving Cutout. 64 Long-Leg-Protrusion. 70 Bolt. 80 Cam-Spindle.
81 Spindle-Protrusion. 82 Bolt-notches. 83 Directional-Fin. 84 Spindle-Tail.
90 Clutch. 91 Short-Fins. 92 Long-Fins. 93 Decode-Fins. 94 Opening-Gap.
95 Faulty-gates. 100 Dial. 101 Teeth. 110 Transfer-Cam. 111 Spindle-tail Slot.
112 Cylinder-tail. 113 Torque-spring Slot 120 Cylinder. 121 Cylinder-tail-slot.
130 Decode-plate. 131 Slope. 132 Decode-fingers. 140 Decode-Bar. 141 Pin.
142 Spring-receiving-bar. 150 Torque Spring. 160 Spindle Spring.
170 Decode Spring. 180 Shackle Spring. 190. Key. 200 Cable Ends. 201. Bolt-Cutout.

DETAILED DESCRIPTION (FIGS. 1A-19C)

Figure 1A:
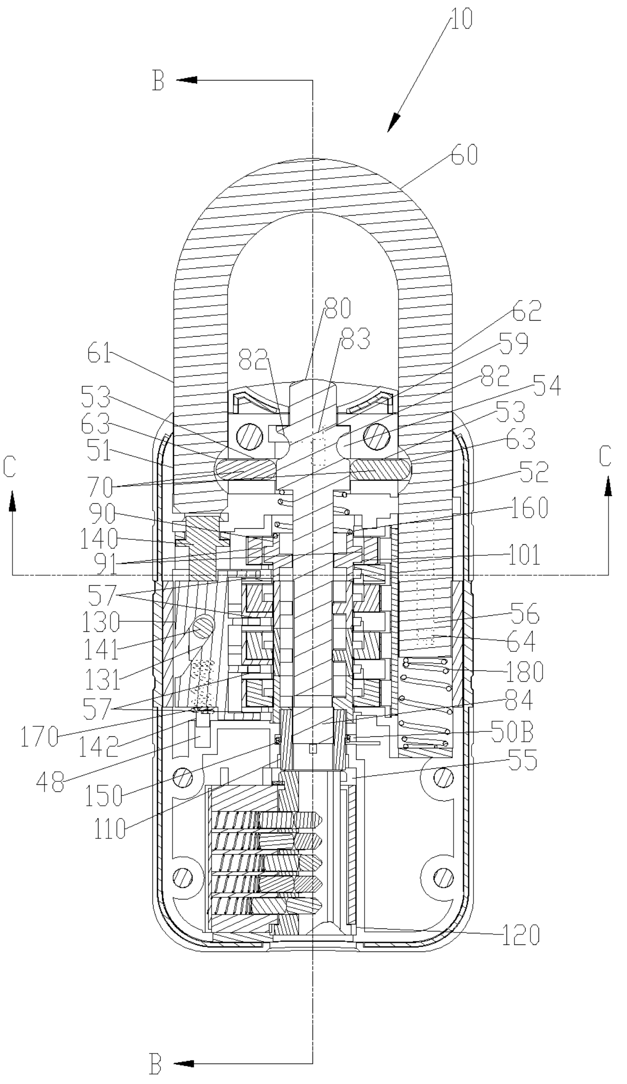
FIG. 1A is a cross-sectional view of an embodiment of the present invention taken along line A-A of FIG. 1B.
Figure 1B:
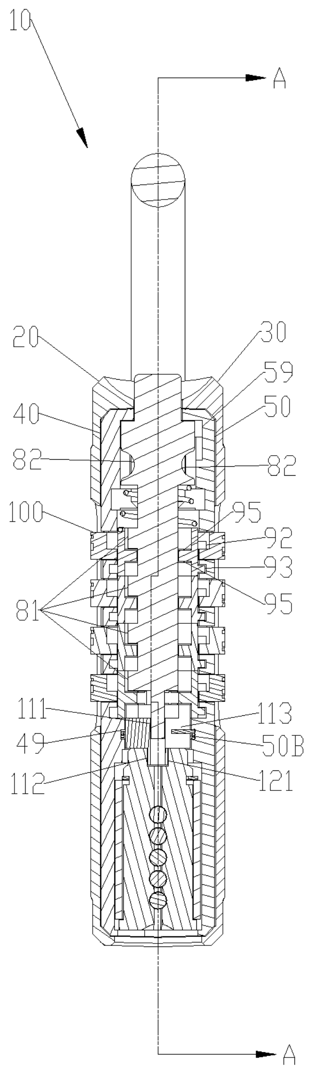
FIG. 1B is a cross-sectional view of an embodiment of the present invention taken along line B-B of FIG. 1A.
Figure 1C:
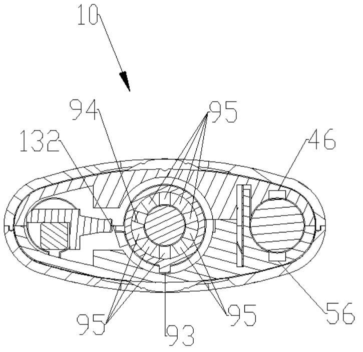
FIG. 1C is a cross-sectional view of an embodiment of the present invention taken along line C-C of FIG. 1A.
Figure 2:
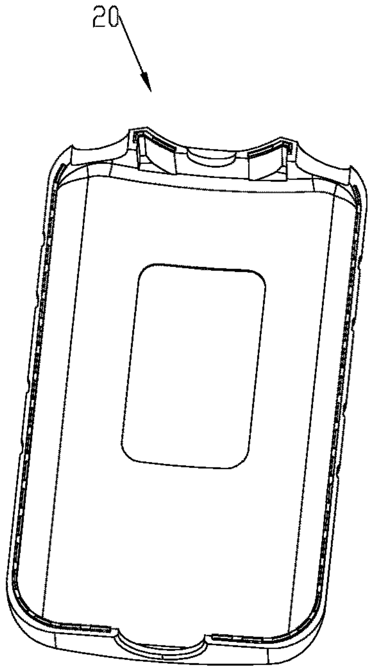
FIG. 2 is a perspective view of a protection cover 20 of the padlock combination.
Figure 3:
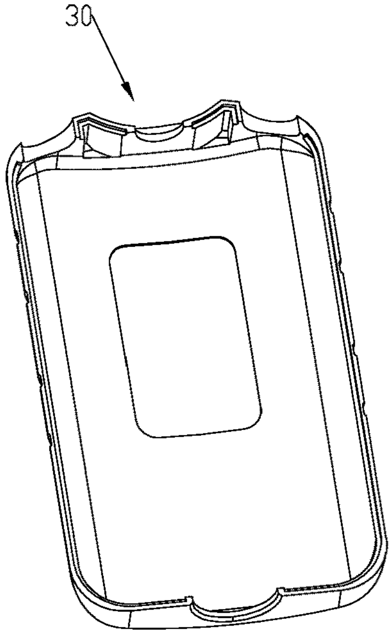
FIG. 3 is a perspective view of a protection cover 30 of the padlock combination.
Figure 4:
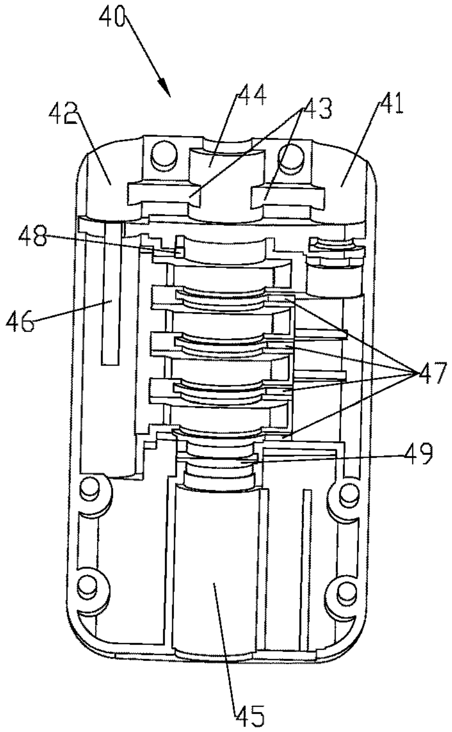
FIG. 4 is a perspective view of a body front side of the padlock combination.
Figure 5:
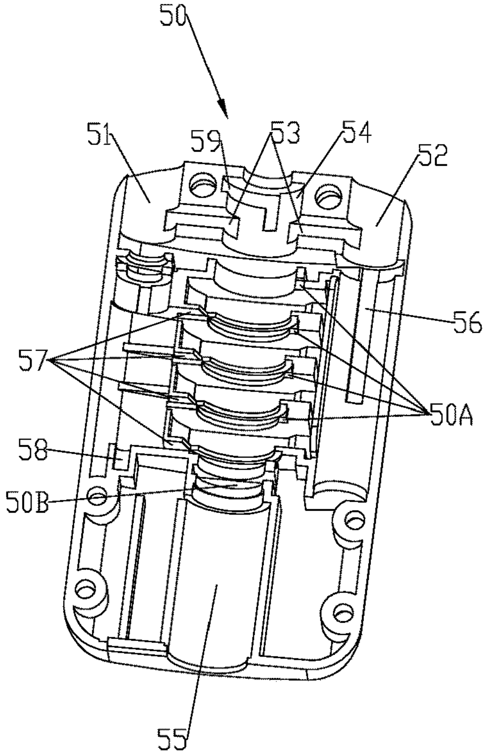
FIG. 5 is a perspective view of a body rear side of the padlock combination.
Figure 6:
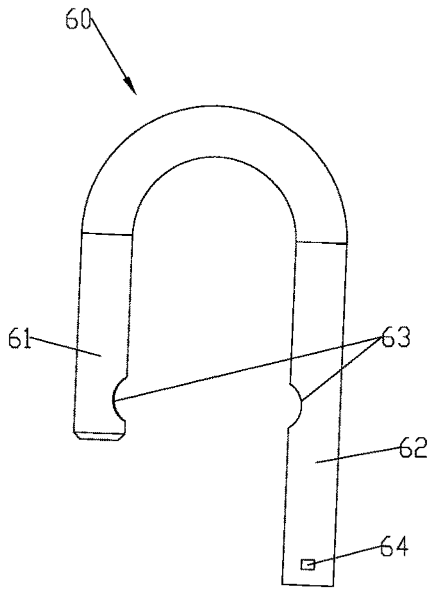
FIG. 6 is a perspective view of a shackle of the padlock combination.
Figure 7:
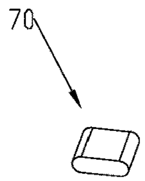
FIG. 7 is a perspective view of a bolt of the padlock combination.
Figure 9A:
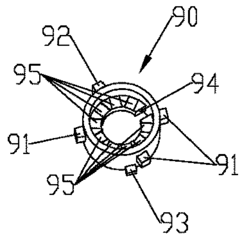
FIGS. 9A and 9B are perspective views of a clutch of the padlock combination.
Figure 8:
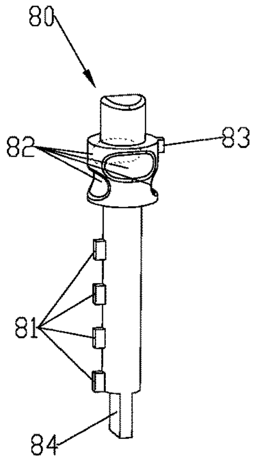
FIG. 8 is a perspective view of a cam-spindle of the padlock combination.
Figure 9B:
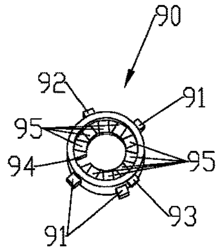
Figure 10:
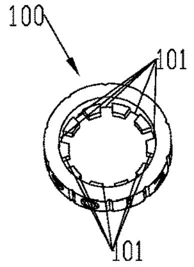
FIG. 10 is a perspective view of a dial of the padlock combination.
Figure 11:
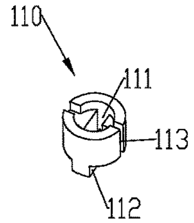
FIG. 11 is a perspective view of a transfer cam of the padlock combination.
Figure 12:
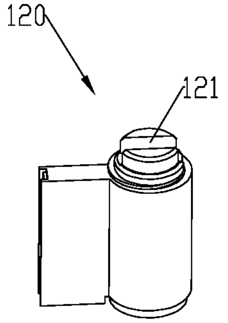
FIG. 12 is a perspective view of a cylinder of the padlock combination.
Figure 13:
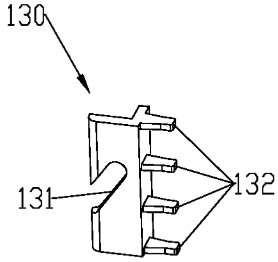
FIG. 13 is a perspective view of a decode-plate of the padlock combination.
Figure 14:
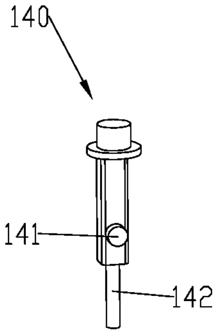
FIG. 14 is a perspective view of a decode-bar of the padlock combination.

The present invention is a padlock 10 with weather protection covers 20/30 to shield lock bodies 40/50 with the following features:

Decode (Lost Code Define) Function

The lock body 40/50 contains a new decode slot 47/57 associated with decode-fingers 132 of the decode-plate 130.

The decode-plate 130 further contains a slope 131 which is connected to the pin 141 of the decode-bar 140. The decode-bar 140 contains a spring-receiving-bar 142 to cause a decode spring 170 to always push the decode-bar 140 upward which will also push the decode-plate 130 leftward. If the lock is opened by key mechanism (described below) then, the user can push the decode-bar 140 downward so that the pin 141 will drag slope 131 of the decode-plate 130 rightward. As the decode-plate 130 shifts rightward, then decode-fingers 132 will move rightward toward the center of the decode slot 47/57. As the decode fingers 132 of the decode-plate 130 move rightward toward the center of the padlock, the decode fingers 132 can catch the decode-fins 93 of the clutch 90 as the clutch 90 is rotated by the dial 100. The dial 100 has teeth 101 which are connected to the shorts-fins 91 and long-fins 92 of the clutch 90. As the dial 100 rotates, then the clutch 90 rotates in the same manner. As the user keeps pushing downward, the decode-bar 140 and the decode fingers 132 will push rightward toward the center. As the clutch 90 rotates in a clockwise manner then the decode fingers 132 will eventually catch the decode-fins on the clutches 90.

This stops the clutches from being rotated and the user will know that the dial is stopped at the correct code which yields to the user the lost code.

Dual Locking Function via Combination Mechanism

The present invention contains a cam-spindle 80 which is controlled by the combination mechanism and key lock mechanism. Both can control the cam-spindle 80 and change it from locked mode to open mode.

The cam-spindle 80 contains a spindle protrusion 81 which aligns the opening-gap 94 of the clutch 90 to let the cam-spindle 80 push downward such that the bolt-notches 82 will align with the bolt 70 such that the bolt 70 will move inward and the bolt-receiving-cutout 63 will no longer engage with the bolt 70. In this manner, the shackle spring 180 will push the shackle upward to open the lock via the combination code. To relock, the combination user pushes the shackle downward, then the spindle spring 160 pushes the cam-spindle 80 upward such that the bolt-notches 82 of the cam-spindle 80 move away from the bolt. Bolt 70 engages the bolt-receiving-cutout 63 of the shackle 60. Hence, the padlock is now back to locked position.

Dual Locking Function via Key Mechanism

The cam-spindle 80 contains a spindle-tail 84 which is connected to the spindle-tail slot 111 of the transfer-cam 110. The cylinder-tail slot 121 of the cylinder 120 is connected to the cylinder-tail 112 of the transfer-cam 110. When a correct key 190 is inserted in the cylinder 120, the cylinder rotates, the cam-spindle 80 then rotates in the same manner. The cam-spindle 80 has a directional-fin 83 which is placed in the rotational-vertical-channel 59 of the lock body 50 which restricts the cam-spindle 80 to rotate to a certain degree to rotate the cam-spindle 80 from the lock mode to the open mode. As the cam-spindle 80 rotates then the bolt-notches 82 will align to the bolt. As they are aligned, the bolt will move toward the bolt-notches 82 and the bolt 70 will move away from the bolt-receiving-cutout 63 of the shackle 60. Then the shackle will be pushed upward by the shackle spring 180 to open the lock. To lock, the key lock user may push the shackle downward to the locked position so that the torque spring 150 is connected to the torque-spring slot 113 of the transfer-cam 110 and the torque-spring slot 49/50B of the body 40/50. The torque spring 150 will automatically rotate the cam-spindle 80 back to locked position such that the bolt-notches 82 will move away from the bolt 70. The bolt 70 will reconnect back to the bolt-receiving-cutout 63 of the shackle 60. Hence, the padlock is now back to locked position.

Locked Mode (FIGS. 1A-14)

The bolt 70 is placed in the bolt slot 43/53 of the lock body 40/50. The bolt 70 is engaged into bolt-receiving-cutout 63 of the shackle 60 which makes the bolt 70 contact the cam-spindle 80. As the cam-spindle 80 has neither rotational nor vertical movement then the bolt 70 is not connected to any of the bolt-notches 82 which maintains the bolt 70 in the locked position. Hence, the lock is in the locked position.

A stack of clutches 90 is assembled inside dials 100. The clutches 90 contains short-fins 91 and long-fins 92 which will engage with the teeth 101 of the dials 100. The clutches further comprise decode-fins 93 which in the lock mode the decode-plate 130 is not activated such that the decode-finger 132 is not placed in the decode-bar-channel 58 of the lock body 50. In such a case, the rotational movement of the dial 100 will freely rotate the clutches 90 in the same manner without any intervention.

The clutches contain an opening-gap 94 which in the lock mode at least one of the opening-gap 94 of the clutch 90 is not aligned to the spindle-protrusion 81 of the cam-spindle 80. In such a case, the cam-spindle 80 is not able to push downward from the top to align the bolt 70 toward the bolt-notches 82. In this case the bolt 70 still remains engaged with the bolt-receiving-cutout 63 of the shackle 60. The lock is in the locked position.

The clutches 90 contain a set of faulty-gates 95 on both sides of the clutches. In such a case, any lock picking is prevented such that pushing the cam-spindle 80 downward from the top will make the spindle-protrusion 81 engage with the faulty-gates 95 which prevent the clutches 90 and dial 100 from rotating. Also, any intruder could push the cylinder 120 inward to try to pick the lock, but also the faulty-gates 95 will prevent the clutches 90 and dial 100 from rotating.

The cam-spindle 80 is always being pushed upward by a spindle spring 160 which is placed in between the cam-spindle 80 and the first top clutch 90.

The cam-spindle 80 is placed inside of clutches 90 and the vertical movement is controlled by the alignment of the opening-gap 94 of the clutches 90 and the spindle-protrusion 81 of the cam-spindle 80. The top of the cam-spindle 80 is placed in the spindle hole 44/54 of the lock body. The cam-spindle 80 contains a spindle-tail 84 which is placed in the spindle-tail slot of the transfer-cam 110. The transfer-cam further contains a cylinder-tail 112 which contacts the cylinder-tail-slot 121 of the cylinder 120. The transfer-cam 110 is placed below the last clutch 90. The spindle-tail slot 111 of the transfer-cam 110 is shaped such that spindle-protrusion 81 of the cam-spindle 80 cannot be freely rotated but only the rotational movement is controlled by the movement of the cylinder 120.

The cylinder 120 is placed in the cylinder-hole 45/55 of the lock bodies 40/50 and the cylinder 120 remains locked when no correct key-cut key 190 is present. In such a case, the cylinder 120 will not be rotated which maintains the lock is in the locked position.

Figure 15A:
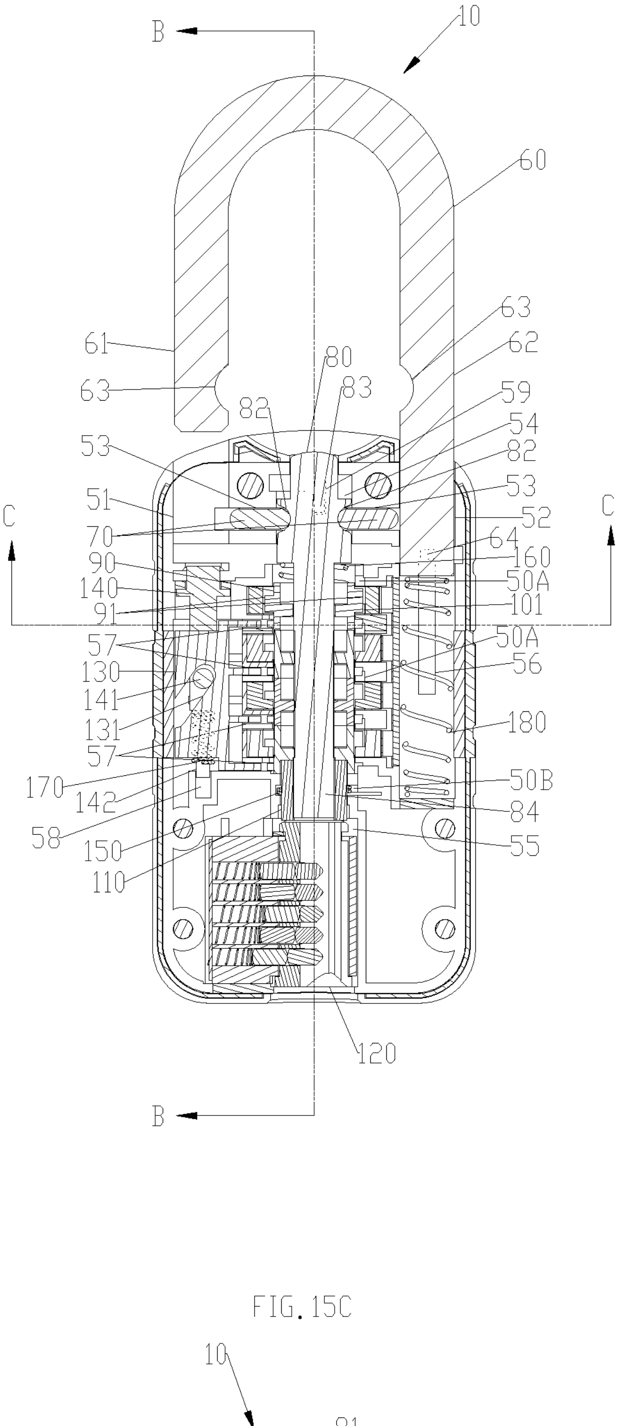
FIG. 15A is a cross-sectional view of the combination padlock taken along line A-A of FIG. 15B.
Figure 15B:
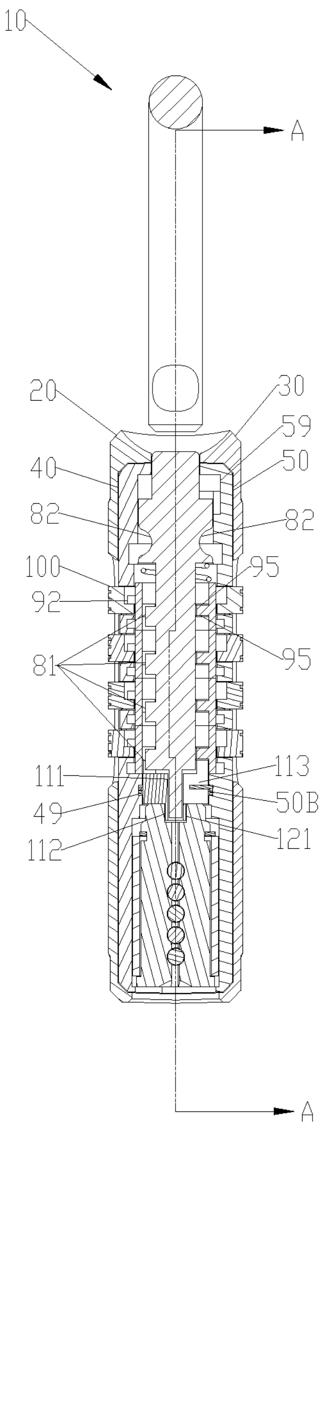
FIG. 15B is a cross-sectional view of the combination padlock taken along line B-B of FIG. 15A.
Figure 15C:
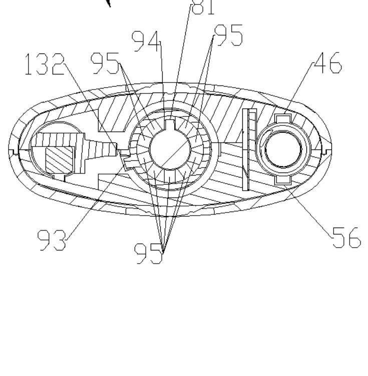
FIG. 15C is a cross-sectional view of the combination padlock taken along line C-C of FIG. 15A.

Unlock by Combination Code (FIG. 15A-15C)

The dials 100 contain teeth 101 which are engaged with the short-fins 91 and long-fins 92 of the clutches 90. The dials turn with the same rotational movement as the clutches. Inside the clutches 90 contain the cam-spindle 80, wherein the vertical movement is controlled by the spindle-protrusion 81 of the cam-spindle 80 and the opening-gap 94 of the clutch 90. To unlock by combination, the user turns the dials 100 such that all opening-gaps 94 of the clutch 90 align with the spindle-protrusion 81 of the cam-spindle 80. In this position, the user can push the cam-spindle 80 downward such that the bolt-notches 82 will align with the bolt 70. In such a case, the bolt 70 will move inward toward the bolt-notches 82 of the cam-spindle 80. Then, there is nothing to block the bolt-receiving cutout 63 of the shackle 60. The shackle spring 180 will then push the shackle 60 upward such that the short leg shackle 61 will push out of the short-leg shackle hole 41/51 of the body 40/50. The long-leg 62 of the shackle 60 is maintained at the long-leg shackle hole 42/52 in all open modes.

It should be noted that the cam-spindle 80 has a directional-fin 83 which in the lock open mode of the combination will move downward the rotational-vertical-channel 59 of the body 50. The directional-fin 83 will then not have rotational movement as the cam-spindle 80 move downward position.

The cam-spindle 80 in the unlock by combination will not have any rotational movement as the cylinder 120 is not being rotated in this mode. The cam-spindle 80 only has the vertical movement.

To close the padlock, push the shackle back to the locked position such that for bolt-receiving cutout 63 of the shackle 60. Then, the spindle spring 160 will push the cam-spindle 80 upward forcing the bolt 70 to engage back to the bolt-receiving cutout 63. The bolt 70 will no longer be in contact with the bolt-notches 82 of the cam-spindle 80. In this case the lock is now back to the locked position by scrambling the dials such that the opening-gap 94 of the clutches 90 rotate away from the spindle-protrusion 81 of the cam-spindle 80.

Figure 16A:
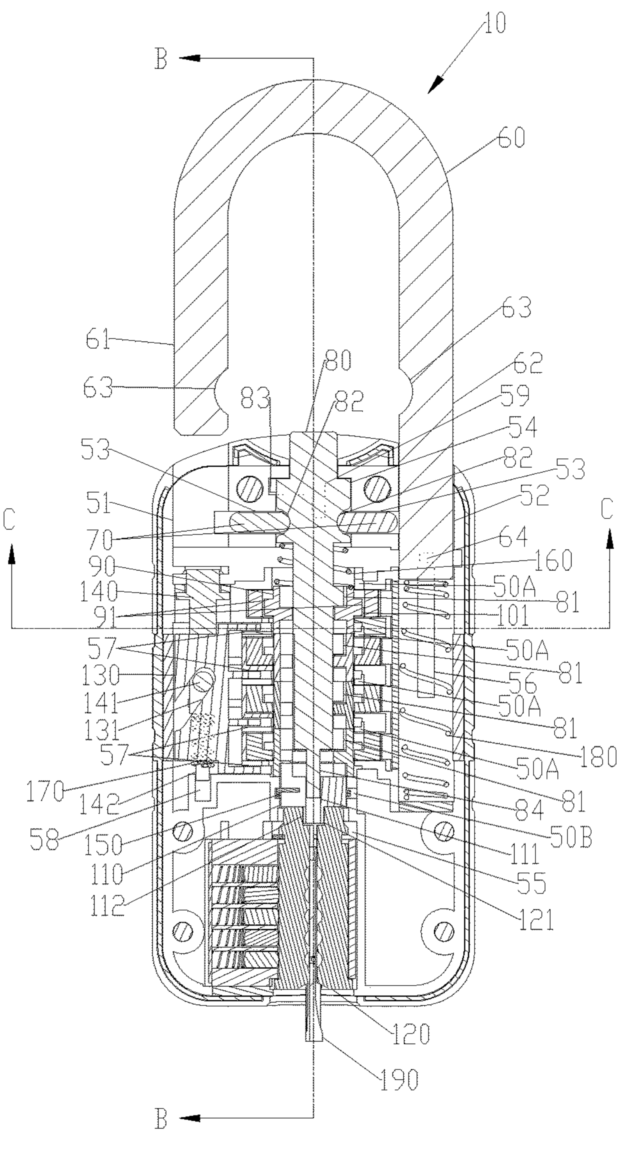
FIG. 16A is a cross-sectional view of the combination padlock taken along line A-A of FIG. 168.
Figure 16B:
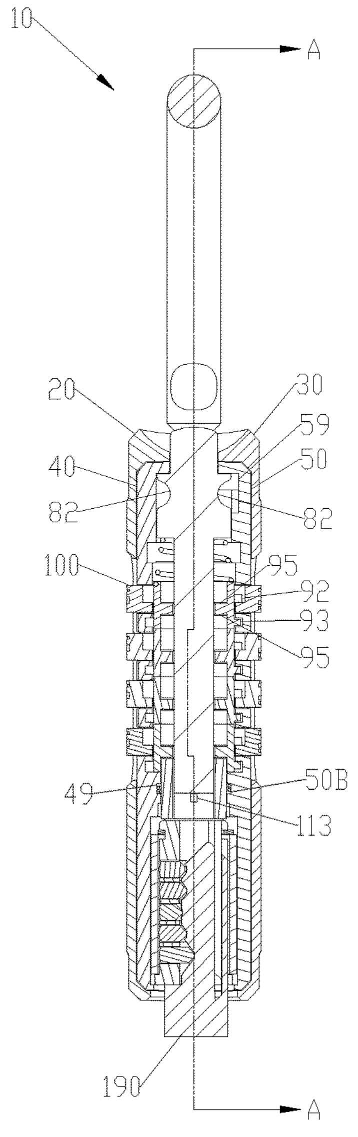
FIG. 16B is a cross-sectional view of the combination padlock taken along line B-B of FIG. 16A.
Figure 16C:
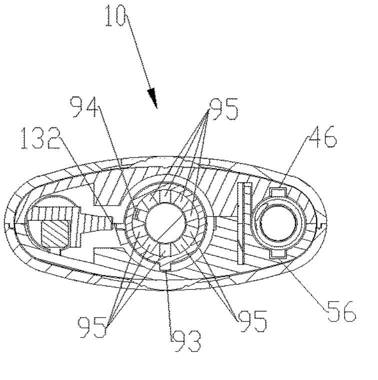
FIG. 16C is a cross-sectional view of the combination padlock taken along line C-C of FIG. 16A.

Unlock by Key User (FIG. 16A-16C)

The cylinder 120 is placed in the cylinder hole 45/55 of the body 40/50. As a correct cut key 190 is being placed into the cylinder 120, the cylinder can be rotated. The cam-spindle 80 has a spindle-tail 84 and is shaped such that the spindle-tail 84 is placed inside of the spindle-tail slot 111 of the transfer-cam 110. The transfer-cam 110 further comprises a cylinder-tail 112 which is placed in the cylinder-tail slot 121 of the cylinder 120. In such a position, the rotational movement of the cam-spindle 80 can only be controlled by the cylinder 120. Also, the cam-spindle has no vertical movement in this unlock by key mode as the opening-gap 94 of the clutches 90 is not aligned with the spindle-protrusion 81 so that the cam-spindle 80 contains no vertical movement.

As the correct cut key 190 is inserted into the cylinder 120, the cylinder 120 rotates and the cam-spindle 80 will rotate in the same manner. As the cam-spindle 80 rotates, the bolt-notches 82 will align to the bolt 70. The shackle spring 180 will push the bolt 70 toward the bolt-notches 82 of the cam-spindle 80 and the bolt will no longer engage with the bolt-receiving cutout 63 of the shackle 60. In this case, the shackle spring 180 will continue to push the shackle upward such that the short leg 61 of the shackle 60 moves away from the short-leg-shackle hole 41/51 of the lock body 40/50. In such a case, the lock is now open via unlock by key.

The cylinder 120 stops its rotation when the directional-fin 83 of the cam-spindle 80 contacts the end of the rotational-vertical-channel 59 of the body 50.

To relock, the user can push the shackle back to the locked position by aligning the short leg 61 of the shackle 60 to the short-leg-shackle-hole 41/51 of the lock body 40/50. Then the shackle is pushed downward such that the bolt-receiving-cutout 63 of the shackle 60 aligns to the bolt 70. There is a torque spring 150 which is placed in between the torque-spring-slot 49/50B of the lock body 40/50 and the torque-spring slot 113 of the transfer cam 110. The torque spring 150 will automatically rotate the transfer cam 110 to the locked position. In such a position, the bolt 70 will fall back to engage with the bolt-receiving cutout 63 of the shackle 60. Due to the sandwich position of the cam-spindle 80, transfer-cam 110 and the cylinder 120, the bolt-notches 82 of the cam-spindle 80 will rotate such that bolt 70 will move away from the bolt-notches 82 and engage with the bolt-receiving-cutout 63 of the shackle permanently. Then, the user can withdraw the key 190 away from the cylinder 120.

Figure 17A:
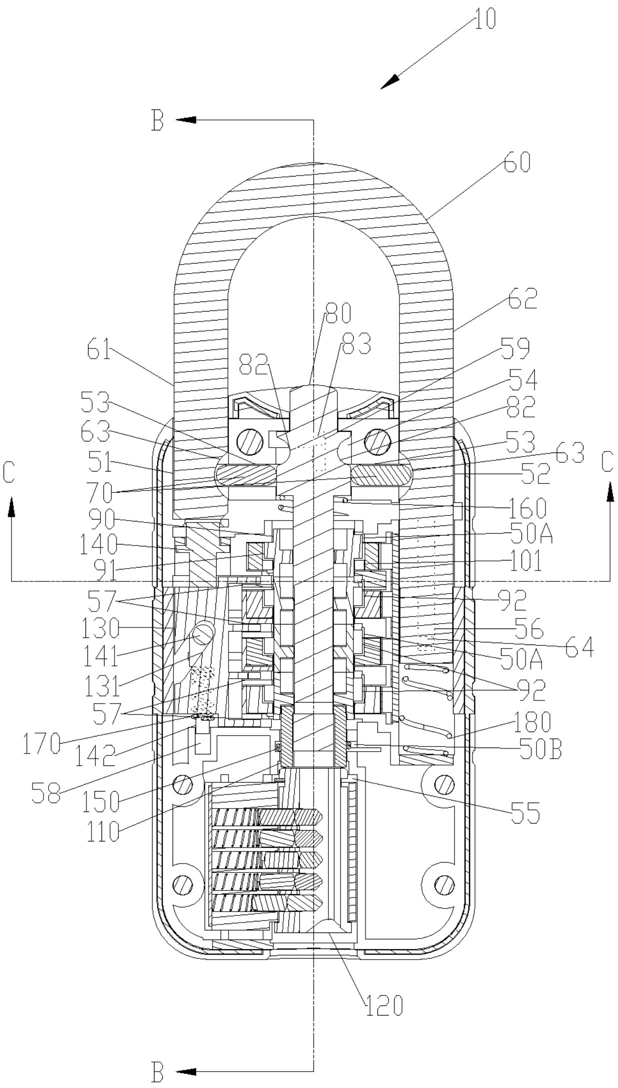
FIG. 17A is a cross-sectional view of the combination padlock taken along line A-A of FIG. 17B.
Figure 17B:
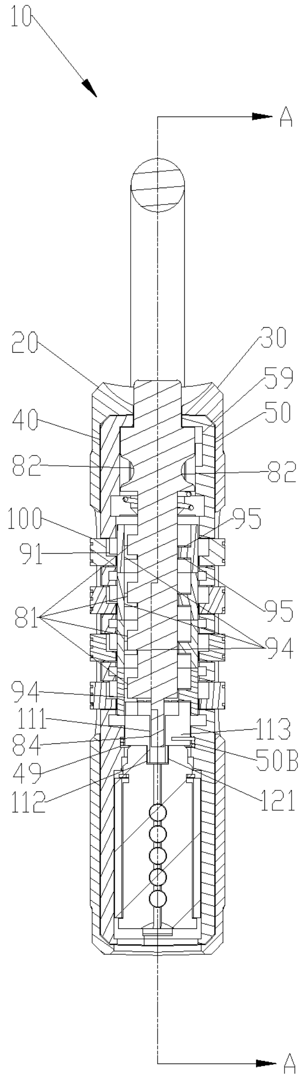
FIG. 17B is a cross-sectional view of the combination padlock taken along line B-B of FIG. 17A.
Figure 17C:
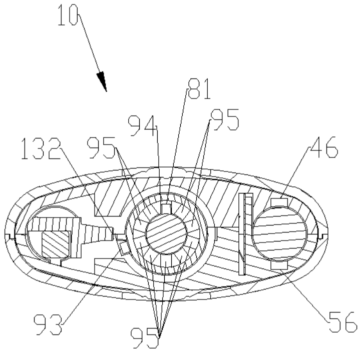
FIG. 17C is a cross-sectional view of the combination padlock taken along line C-C of FIG. 17A.

Reset Combination Code (FIG. 17A-17C)

The reset of the combination code has to be done when all dials 100 align with the combination open code such that the opening-gap 94 of the clutches 90 are aligned to the spindle-protrusion 81 of the cam-spindle 80. Then, the user can push the cylinder 120 inward such that the transfer-cam 110 will be pushed upward and also pushing the clutches 90 upward. As the clutches 90 are being pushed upward, the opening-gap 94 will engage with the spindle-protrusion 81 of the cam-spindle 80. The long-fins 92 of the clutches 90 will also engage with the reset-fin-slot 48/58 of the lock body 40/50. In such a case, this will restrict any rotational movement of the clutches 90. As the clutches are being pushed upward, the short-fin 91 and the long-fins 92 of the clutches 90 will disengage from the teeth 101 of the dials 100.

While the user keeps pushing the cylinder, the user can rotate the dials to set the new code.

After setting, the user can release the cylinder so that the spindle spring 160 will push the clutches 90 downward. As the clutches 90 are pushed downward, then the short-fin 91 and the long-fin 92 will engage back to the teeth 101 of the dial 100. Also, the long-fin 92 will disengage away from the reset-fin-slot 48/58 of the lock body 40/50. The lock is now set to new code for unlock by combination.

Figure 18A:
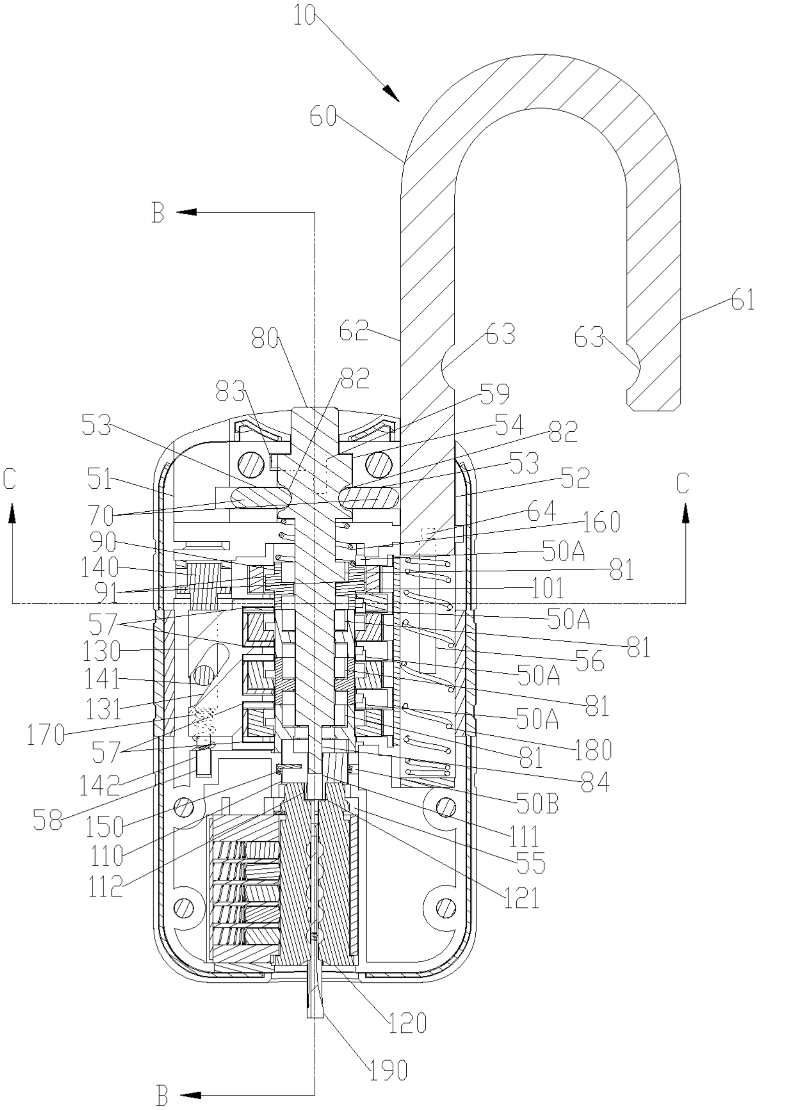
FIG. 18A is a cross-sectional view of the combination padlock taken along line A-A of FIG. 18B.
Figure 18B:
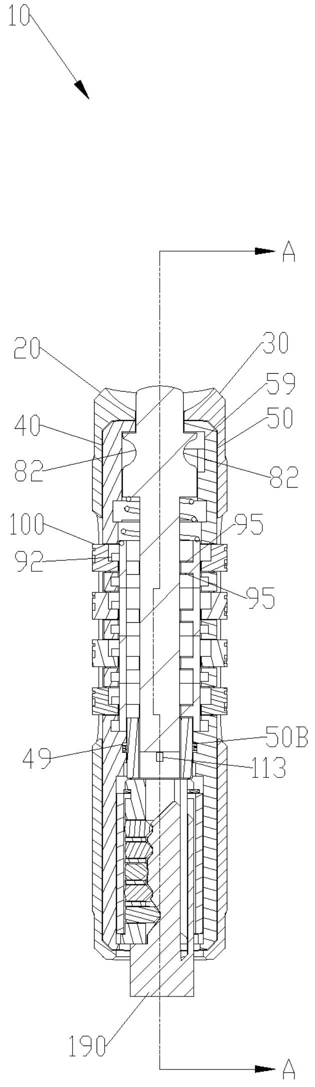
FIG. 18B is a cross-sectional view of the combination padlock taken along line B-B of FIG. 18A.
Figure 18C:
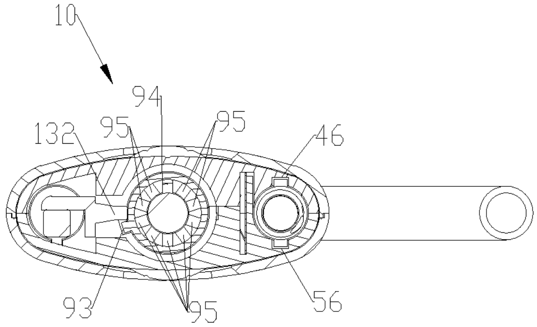
FIG. 18C is a cross-sectional view of the combination padlock taken along line C-C of FIG. 18A.

Decode Function (FIG. 18A-18C)

The lock body 40/50 contains a new decode slot 47/57 which is to place the decode-finger 132 of the decode-plate 130. The decode-plate 130 further contains a slope 131 which is connected to the pin 141 of the decode-bar 140. The decode-bar 140 contains a spring-receiving-bar 142 which causes a decode spring 170 to always push the decode-bar 140 upward which will also push the decode-plate 130 leftward.

The decode function can be activated when the user opens the lock via key mechanism. After the lock is opened by the key mode as described above, the short-leg shackle 61 of the shackle 60 has moved away from the short-leg-shackle hole 41/51 of the lock body 40/50. Then the user can use a sharp and narrow object such as a screwdriver to push the decode-bar 140 downward.

When the lock is opened by the key mechanism, the user can push the decode-bar 140 downward so that the pin 141 will drag slope 131 of the decode-plate 130 rightward. As the decode-plate 130 shifts rightward then, decode-fingers 132 will move rightward toward the center of the decode slot 47/57. As the decode finger 132 of the decode-plate 130 moves rightward toward the center of the padlock the decode finger 132 can catch the decode-fins 93 of the clutch 90 as the clutch 90 is being rotated by the dial 100. The dial 100 has teeth 101 which are connected to the shorts-fins 91 and long-fins 92 of the clutch 90. As the dial 100 rotates then the clutch 90 rotates in the same manner. As the user keeps pushing downward the decode-bar 140, then the decode finger 132 will be pushed rightward toward the center. As the clutch 90 rotates in a clockwise manner then the decode finger 132 will eventually catch the decode-fins 93 on the clutches 90. It will stop the clutches from being rotated and the user will know that the dial is stopped at the correct code so as to yield the lost code to the user.

By doing each dial then the user can determine the entire the lost code. The user can release the decode-bar 130 so that the decode spring 170 is placed in the spring-receiving-bar 142 so as to push the decode-bar 140 upward. As the decode-bar 140 is being pushed upward, the pin 141 of the decode-bar 140 will drag the slope 131 of the decode-plate 130 leftward. In such a case, the decode-finger 142 will move leftward away from the decode-slot 47/57 of the lock body 40/50. In such a case, the rotational movement of the decode-fins 93 of the clutch 90 will not contact anything as the decode-fingers 132 of the decode-plate 130 has moved away from the decode-slot 47/57 of the lock body 40/50.

Cam-spindle 80 contains at least two sets of bolt-notches 82. One is controlled by the combination mechanism and the other set of bolt notches is controlled by the key mechanism. For this embodiment of the invention, the combination-controlled bolt notches are below the key mechanism-controlled bolt-notches 82 and the combination bolt notches are below and perpendicular to the key-controlled bolt notches.

Figure 19A:
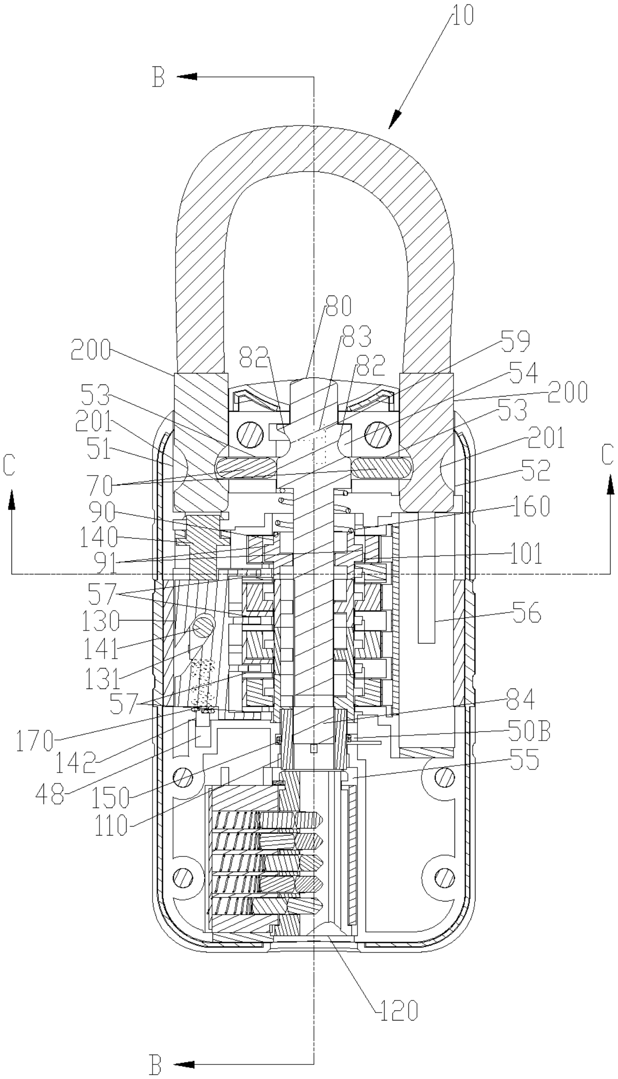
FIG. 19A is a cross-sectional view of a second embodiment of the combination padlock taken along line A-A of FIG. 19B.
Figure 19B:
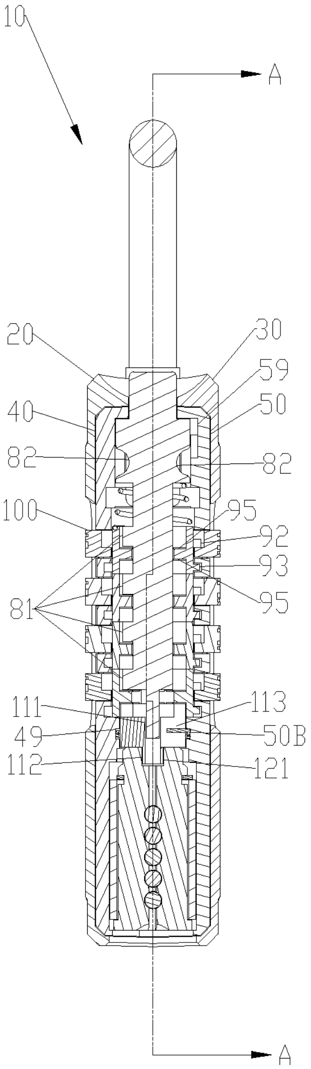
FIG. 19B is a cross-sectional view of the combination padlock taken along line B-B of FIG. 19A.
Figure 19C:
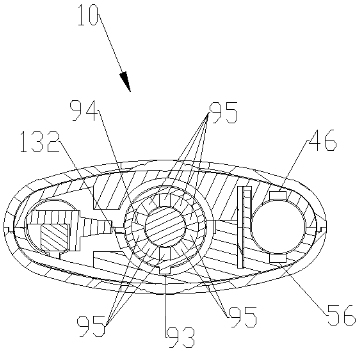
FIG. 19C is a cross-sectional view of the combination padlock taken along line C-C of FIG. 19A.

Second Embodiment With Cable Function FIG. 19A-19C

The padlock can comprise a cable with a set of cable ends 200 to replace the shackle 60. The cable ends 200 can further contain a bolt-cutout 201 to engage the bolt 70 in the lock mode which is similar to the function of the bolt-receiving cutout 63 of the shackle 60.

What is claimed is:

1. A padlock comprising:

a lock body, a shackle, a pair of locking bolts configured for engagement with the shackle, wherein the shackle has a long leg for engagement with one of the pair of locking bolts and a short leg for engagement with the other of the pair of the locking bolts, a combination mechanism to control the movement of a cam-spindle vertically, and a key mechanism to control the movement of the cam-spindle rotationally, wherein the combination mechanism comprises more than one clutch that isare mounted in the cam-spindle which controls the vertically movement of the cam-spindle, wherein the cam-spindle is configured to control the locking and unlocking of the combination mechanism, and wherein the combination mechanism comprises more than one dial are mounted in the lock body, wherein the cam-spindle has at least two sets of bolt-notches, one set of bolt notches controlled by the combination mechanism and the other set of bolt notches controlled by the key mechanism, wherein one bolt notch of the set of bolt notches controlled by the combination mechanism is configured for engagement with one of the pair of locking bolts, and the other bolt notch of the set of bolt notches controlled by the combination mechanism is configured for engagement with the other of the pair of locking bolts, and wherein the bolt notches for the combination mechanism are positioned substantially perpendicular on the cam-spindle to the bolt notches for the key mechanism.

2. The padlock according to claim 1, wherein the cam-spindle is split in two parts.

3. The padlock according to claim 1, wherein the bolt-notches for the combination mechanism are different than the bolt-notches for the key mechanism.

4. The padlock according to claim 1, wherein the cam-spindle has a spindle-protrusion for each of the more than one clutches, which each spindle-protrusion aligns with an opening-gap of the corresponding clutch of the one more than one clutches to open the padlock.

5. The padlock according to claim 1, wherein the cam-spindle has a direction fin assembled in a rotational-vertical channel of the lock body and controls an amount of rotation of the key mechanism and an amount of vertical movement by the combination mechanism.

6. The padlock according to claim 5, wherein the cam-spindle contains a spindle-tail which is connected to a transfer cam which is then connected to the cylinder for key mechanism.

7. The padlock according to claim 1, wherein the padlock further comprises a decode mechanism.

8. The padlock according to claim 7, wherein the decode mechanism can be activated when the padlock is in an open mode.

9. The padlock according to claim 8, wherein the decode mechanism has a decode-bar and a decode-plate, wherein the decode-bar contains a pin which can drive a slope of the decode-plate rightward to push thea decode finger of the decode plate toward a decode slot of the lock body, and wherein as the decode-bar is pushed, a rotation of the clutch in a certain rotation causes a decode fin to be in contact with the decode-finger to determine a lost code.

10. The padlock according to claim 1, wherein a transfer cam is connected between the cylinder and the cam-spindle to control the rotational movement of the cam-spindle to control the padlock open and closing positions.

* * * * *